Nov. 29, 1966     P. EUSER     3,287,976

COMPENSATION RADIATION PYROMETER

Filed July 24, 1963

United States Patent Office 3,287,976
Patented Nov. 29, 1966

3,287,976
COMPENSATION RADIATION PYROMETER
Pieter Euser, Delft, Netherlands, assignor to Nederlandse Centrale Organisatie voor Toegepast-Natuurwetenschappelijk Onderzoek, The Hague, Netherlands, a corporation of the Netherlands
Filed July 24, 1963, Ser. No. 297,387
Claims priority, application Netherlands, Aug. 14, 1962, 282,040
2 Claims. (Cl. 73—355)

The present invention relates to a compensation radiation pyrometer for measuring the temperature of swiftly moving objects.

To be able to measure such a temperature the response (adjusting time) of the radiation pyrometer should be short.

This application relates to a compensation radiation pyrometer of the type disclosed in Patent application Serial No. 56,528, now Patent No. 3,164,021 issued on January 5, 1965, previously filed by the present applicant and Jan De Jong, which, in addition to a considerable constructive simplification, also shows a greater sensitivity and a short response. However, the response achieved in it is not sufficiently short for purposes of measuring swiftly moving objects.

The compensation radiation pyrometer described in the said patent consists of a heat flow meter wound about a ribbon of insulating material, the cold junctions of the heat flow meter being situated in the middle of two flat sides of said ribbon and a measuring thermo-couple being enveloped by its turns. Behind one of the two flat sides there is situated a heating element, the parts of the whole being insulated with respect to each other being assembled into one single element.

In this compensation radiation pyrometer the response amounts to about 30 seconds, which makes it, however, too slow for measuring the temperature of swiftly moving objects.

The primary object of the invention therefore is the provision of a compensation radiation pyrometer the response of which is so short that the temperature of swiftly moving objects can be measured. For a further discussion of the principles of operation of the invention, reference is made to the said Patent No. 3,164,021.

Another object is the provision of a compensation radiation pyrometer of a novel mounting.

A further object is the appliance of a differential resistance element as a zero-indicator, built up from a thin insulation plate, on both sides of which there is provided a very thin resistance thermometer.

A still further object is the provision of a heating element the surface of which is much larger than the surface of the radiation receiver, for purposes of preventing the occurrence of boundery effects.

Another object of the invention is that both sides of the differential resistance element can be built up from two separate equal electric conductors of temperature-sensitive resistance material, which can be incorporated in a Wheatstone bridge, which is further to be appointed in such a way that simultaneously to a heating current being sent through the side which is turned away from the object, the resistance is measured of the side which is turned towards the object, so that herefrom the temperature can be derived. In this way the heating capacity of the whole may be kept very low.

Another object is that a resistance thermometer or a thermo-couple for measuring the temperature can be provided in the middle between the two electric conductors of temperature-sensitive resistance material, so that a very thin and homogeneous construction is obtained.

Other objects of the invention will become apparent from the following description taken in connection with the accompanying drawings.

Figure 1:
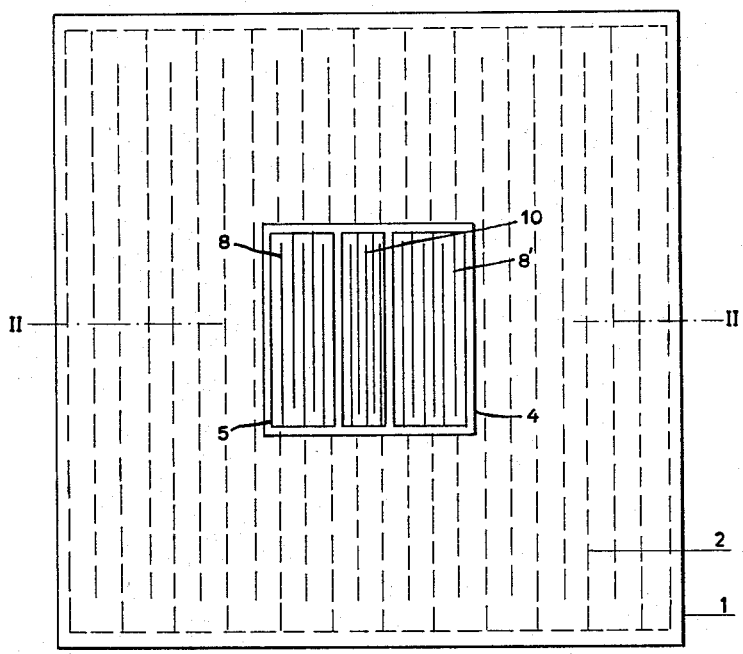
FIG. 1 is a top view of the pyrometer of an enlarged scale.
Figure 2:
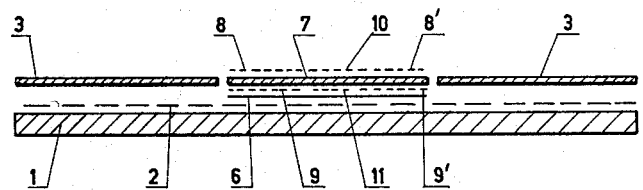
FIG. 2 is a cross-section along the line II—II in FIG. 1, the composing parts being drawn apart from one another.

A heating element 2 is provided on a carrier 1 of, for instance a ceramic material, whereby the heating element may for instance be formed from an incised film of resistance material.

The heating element 2 is covered by a thin plate 3 of electrically and thermally insulating material such as for instance glass. In the exact centre of the covering plate 3 is provided a square opening 4, into which fits exactly the differential resistance element 5, the surface of which here amounts to one-ninth of the surface of the heating element 2. In order to prevent contact being made with the heating element 2, an extremely thin insulating plate of, for example, mica, is provided between the said heating element 2 and the differential resistance element 5.

The differential resistance element 5 is built up from a thin plate 7 of electrically and thermally insulating material, for instance a glass plate of a thickness of about 0.2 mm., on each side of which is provided a very flat electric conductor consisting of two separate very flat electric conductors 8 and 8' on the top of the plate 7, and two separate very flat electric conductors 9 and 9' on the bottom of the plate 7, all four of said conductors being made of a strongly temperature-sensitive resistance material. The four parts thus provided, together form the resistances for the bridge circuit.

Between each pair of conductors 8 and 8' and between conductors 9 and 9' are provided separate resistance thermometers 10 and 11 respectively. The two resistance thermometers 10 and 11 are used together with conductors 8, 8', 9 and 9' to form a Wheatstone bridge. It can be seen in FIG. 1 that each of the elements 8, 8', 9, 9', 10 and 11 include a number of lines starting alternately from one end and then from the other end of the element. This is referred to in the claims for convenience as a "zig-zag" formation. Of course it would also be possible to employ the more well known "zig-zag" formation using a single wire bent back and forth.

Because all the very thinly constructed composing parts on either side of the thin glass plate 7 are situated in one plane, a very simple and above all a homogeneous construction is obtained, which allows of an accurate and swift compensation.

A thinly constructed thermo-couple may be employed instead of the resistance thermometers 10 and 11.

The shape of the compensation radiation pyrometer of this invention is not limited to the square shape represented by way of example. It may be of any desired shape, including a curved or a cylindrical one.

For measuring the temperatures of objects having curved surfaces, such as for instance wires and the like, a plurality of pyrometers of flat construction may be positioned round about the object to be measured.

The advantage of the curved shape is that the radius of curvature can be adapted to that of the object to be measured.

I claim:

1. A compensation radiation pyrometer for measuring the temperature of swiftly moving objects comprising, a heating element covered with a thin electrically and thermally insulating plate, a radiation receiver in the center of said plate having an area at most one-fourth of the area of the heating element and electrically insulated therefrom; said radiation receiver comprising a thin plate of electrically and thermally insulating material, both a differential electrical resistance element of temperature sensitive material and an electrical temperature measuring device mounted on each side of said thin plate, each said resistance element and measuring device being arranged in a generally zig-zag formation.

2. A compensation radiation pyrometer according to claim 1 characterized in that the electric conductor of temperature sensitive resistance material comprises two equal parts lying in the same plane and on opposite sides of, and coplaner with, the said respective electrical temperature measuring device.

References Cited by the Examiner

UNITED STATES PATENTS

| | | |
|---|---|---|
| 2,611,541 | 9/1952 | Gray. |
| 2,666,089 | 1/1954 | Gier et al. |
| 2,785,860 | 3/1957 | Harrison et al. _____ 73—355 X |
| 3,012,212 | 12/1961 | Hicks _____ 73—355 X |
| 3,164,021 | 1/1965 | De Jong et al. _____ 73—355 |

LOUIS R. PRINCE, *Primary Examiner.*

STEVEN H. BAZERMAN, *Assistant Examiner.*